Oct. 30, 1973  T. A. HOULDRIDGE  3,769,232

POLYURETHANE FOAM GENERATING APPARATUS

Filed April 26, 1971

THOMAS A. HOULDRIDGE
INVENTOR

BY

ATTORNEY

United States Patent Office 3,769,232
Patented Oct. 30, 1973

3,769,232
POLYURETHANE FOAM GENERATING
APPARATUS
Thomas A. Houldridge, Berea, Ohio, assignor to
Olin Corporation
Filed Apr. 26, 1971, Ser. No. 137,506
Int. Cl. B01d; B01f 15/00; B28b 17/00; B29c; C08c 17/08
U.S. Cl. 252—359 E                                    7 Claims

ABSTRACT OF THE DISCLOSURE

An improvement is disclosed in an apparatus for the on-site generation of polyurethane foam, which apparatus comprises storage tanks for supplying the foam-forming reactants, a static mixing chamber, and means for conveying the reactants through the mixing chamber. The improvement resides in providing means for simultaneously regulating the flow of reactants into and out of the mixing chamber.

---

This invention relates to an apparatus for the on-site generation of polyurethane foam. More particularly the invention relates to an improvement in this art aimed at achieving adequate mixing of the foam-forming reactants and at controlling the size of repeated shots when the apparatus is employed to generate and dispense small shots of foams.

Several portable apparatus have been disclosed in the art for the generation of polyurethane foam. See for example U.S. Pats. 3,541,023 which issued Nov. 17, 1970 to Cole and 3,178,157 issued to Cole on Apr. 13, 1965. Such apparatus usually comprise two storage tanks for supplying two inter-reactive polyurethane-forming materials, means for imposing a gas pressure in these tanks to expel the reactants therefrom, and a static mixing chamber, having an outlet and two valved inlets, for mixing the reactants before they are dispensed as a foaming mixture from the chamber outlet. These prior art apparatus thus enable dispensing polyurethane foam on-site for use in an increasing number of applications such as making molded foam insulation, furniture parts, structural elements and so forth.

However, the utility of such prior art apparatus in small-shot, foam-generating applications has not been fully developed due to several drawbacks. One of the main drawbacks is that it is difficult in using these conventional apparatus to control and duplicate small-size foam shots. Another drawback is that in such applications, using repeated, short-duration shots, it is difficult to achieve adequate mixing of the reactive foam-forming ingredients in a conventional-type, static mixing chamber before they are dispensed therefrom. This results in a non-uniform, at times unsatisfactory, foam product which may vary in physical properties from shot to shot. A still further drawback is the excessive dripping of foam-forming reactants from the mixing chamber outlet which contributes to a high proportion of reactants being wasted.

Now it has been found, in accordance with this invention, that the above drawbacks of the prior art can be overcome by utilizing the improved apparatus of the invention as described in detail hereinafter. Briefly, the improvement resides in placing a valve at the outlet of the mixing chamber and linking this valve with the mixing chamber inlet valves for simultaneous operation i.e. opening and closing of all three valves. It has been found that this arrangement enables adequate, uniform mixing of the foam-forming ingredients as they are dispensed from the mixing chamber in repeated, small shots. Better control and duplication of small shot size is also achieved, and dripping and waste are minimized.

Figure 1:
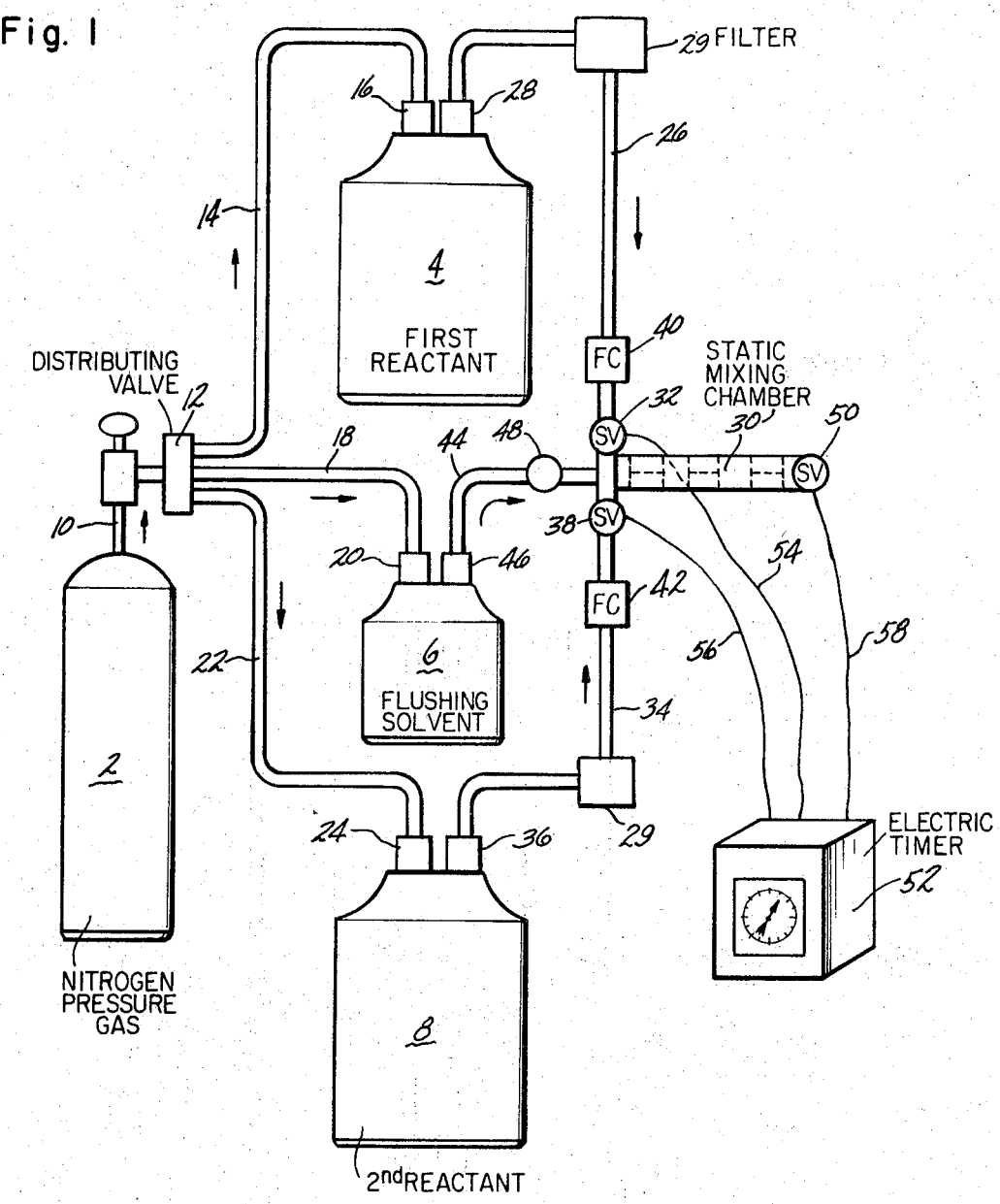
Figure 2:
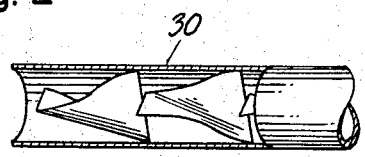

Reference will now be made to the drawings in which FIG. 1 is a schematic illustration of a preferred apparatus used in practicing the invention and FIG. 2 shows a static mixing chamber for use in the apparatus of FIG. 1.

The apparatus shown comprises a nitrogen tank 2 which is used to pressurize first reactant storage tank 4, solvent tank 6, and second reactant storage tank 8. The nitrogen tank has an outlet 10 connected to a three-outlet, gas pressure distributing valve 12 which in turn communicates with first reactant storage tank 4 via line 14 and tank inlet 16, solvent tank 6 via line 18 and tank inlet 20, and second reactant storage tank 8 via line 22 and inlet tank 24.

Line 26 connects first reactant storage tank 4, via its outlet 28, to static mixing chamber 30 through a solenoid-actuated valve 32 located at a first inlet to the mixing chamber. Likewise line 34 connects second reactant storage tank 8, via its outlet 36, to mixing chamber 30 through a second solenoid-actuated valve 38 located at a second inlet to the mixing chamber. Interposed between outlet 28 and valve 32 and between outlet 36 and valve 38, respectively, are two flow controllers 40 and 42.

Line 44 connects an outlet 46 of solvent tank 6 to mixing chamber 30 via valve 48 located at a third inlet to mixing chamber 30.

At its outlet, mixing chamber 30 is provided with a solenoid-actuated valve 50. An electric timer 52 is connected to valves 32, 38 and 50 via electrical conductors 54, 56, and 58, respectively. The timer may be connected to a conventional electric power source (not shown) which activates it.

More in detail, nitrogen tank 2 is a conventional nitrogen gas tank used to impose a sealed gas pressure on the interiors of reactants storage tanks 4 and 8 and solvent tank 6. While any other means may be employed to impose gas pressure on these tanks to expel the materials therein, the use of a nitrogen gas tank is preferred. A conventional three-outlet distributing valve 12 is conveniently used to distribute the nitrogen gas pressure among tanks 4, 6, and 8. The outlets of this distributing valve are linked to the inlets of tanks 4, 6, 8 via conventional connecting lines or hoses 14, 18, and 22, respectively.

The nitrogen gas pressure imposed on reactants storage tanks 4 and 8 forces the inter-reactive materials therein up through outlets 28 and 36 and into lines or hoses 26 and 34, respectively, for delivery to mixing chamber 30. Entry of these reactive materials into mixing chamber 30 is effected by opening mixing chamber inlet valves 32 and 38. These valves can be of any conventional open-and-shut type. In the particular embodiment illustrated in the drawing, these valves are gate valves.

Flow controllers 40 and 42 may be interposed in lines 26 and 34, respectively, between outlet 28 and valve 32 and between outlet 36 and valve 38. The use of these flow control units is optional according to the invention, their purpose being to insure constant flow of reactants, from their respective tanks, in a predetermined or adjusted, fixed ratio. Any type of flow control units useful for this purpose may be employed. As shown in the preferred embodiment illustrated herein, the flow controllers described in detail in U.S. Pat. 3,541,023, issued Nov. 17, 1970 to Cole, are employed. These controllers, detailed in FIGS. 3 and 4 of the Cole patent, incorporate means to enable adjusting the flow therethrough to any desired constant rate so that the relative proportions of reactants flowing from tanks 4 and 8 can be varied.

In some applications, and in accordance with a preferred embodiment of the invention, filter elements 29 may be interposed or placed in lines 26 and 34. The purpose of the filter elements, which may be of any conventional type, is to remove any foreign, solid particles present in the materials flowing from reactants storage tanks 4 and 8 before these are admitted into mixing chamber 30.

With valves 32 and 38 open, the reactants from tanks 4 and 8 are admitted into mixing chamber 30 where they are mixed together, as they pass through the chamber, before they are dispensed from valve 50 at the mixing chamber outlet. The mixing chamber 30 can be any type of static mixer known in the art, such as disclosed for example in U.S. Pat. 3,286,992, issued Nov. 22, 1966 to Armeniades et al. and U.S. Pat. 3,361,412, issued Jan. 2, 1968 to Cole. Such static mixers usually have no moving parts, and they have a variety of internal configurations designed to effect adequate mixing of two or more fluids flowing therethrough. As shown in the preferred embodiment illustrated herein, however, the mixer of the Armeniades et al. Pat. 3,286,992, the entire disclosure of which is incorporated by reference herein, is employed. This consists essentially of a hollow cylindrical tube having a plurality of curved, sheet-like elements extending in series longitudinally within the tube. Each element extends to the tube wall throughout its length and divides the tube into separate chambers, the total cross-sectional area of each chamber being substantially constant throughout the length of the tube. The elements are arranged in alternating positions and in point-contact with one another.

The mixed reactants are dispensed from mixing chamber 30 through its outlet valve 50. This valve can be any type of conventional open-and-shut valve similar to valves 32 and 38.

It is important according to the invention, that means be provided linking all mixing chamber inlet valves 32 and 38 and mixing chamber outlet valves 50 for simultaneous operation i.e., opening and closing. Any means may be employed for this purpose such as a single trigger adapted to open and close all three valves at the same time. In the preferred embodiment illustrated herein this means comprises three solenoids, each solenoid activating one of the three valves, the solenoids being connected to a conventional electric timer 52. The timer, powered by a conventional electric power source, can be set to activate the solenoids, which in turn actuate the opening of the valves, for any pre-selected interval of time. This pre-selected interval can be varied, within the cycle time range allowed by the particular timer, depending on the amount of foam desired to be dispensed in a single shot. The timer employed in the illustrative embodiment has a cycle time range of 0–15 seconds.

After repeated operation of the apparatus of the invention, some of the reactive materials flowing through mixing chamber 30 may solidify and accumulate inside the mixing chamber or inside its outlet valve 50. This accumulation may hinder the proper functioning of the mixing chamber. When that happens, foam generation may be stopped to permit cleaning the mixing chamber and outlet valve 50. One convenient method of accomplishing this, as illustrated herein, utilizes a solvent for flushing the mixing chamber and outlet valve 50, the solvent being supplied by solvent tank 6. To this end, outlet valve 50 is disconnected from timer 52 in order to enable its opening while inlet valves 32 and 38 remain closed. With outlet valve 50 open and inlet valves 32 and 38 closed, mixing chamber inlet valve 48 is opened permitting the solvent to flow through the mixing chamber and outlet valve 50, removing accumulated residue therefrom. Thereafter mixing chamber inlet valve 48 is closed, outlet valve 50 is re-connected to timer 52, and the generation of foam is continued.

As is well-known in the art, polyurethane foam is produced, using the one-shot or the pre-polymer technique, by the reaction of a polyol with an organic polyisocyanate in the presence of a reaction catalyst and a foaming agent. Any known foam-forming formulation may be generated by, and dispensed from, the apparatus of the invention. Thus the polyol reactant can be any alcohol, having at least two active hydrogens as determined by the Zerewitinoff method, such as disclosed, for example, in U.S. Pat. 3,167,538 which issued Jan. 26, 1965 to Kaiser et al. Similarly any organic isocyanate containing at least two NCO groups may be utilized in preparing the foam. Illustrative polyisocyanates are disclosed in U.S. Pat. 2,683,730, issued July 13, 1954 to Seeger et al. The foaming agent can be any one of those known in the art to be useful for this purpose such as water, an organic foaming agent, or a mixture of at least two foaming agents. Illustrative organic foaming agents are disclosed in U.S. Pat. 3,072,582 which issued Jan. 8, 1963 to Frost. Finally any catalyst or mixture of catalysts known to be useful in making polyurethane foam may be employed such as disclosed for example in U.S. Pat. 3,397,158 which issued to Britain et al. on Aug. 13, 1968.

In utilizing the apparatus of the invention, a first reactive material comprising a polyol is placed in one of the reactant storage tanks, for example first reactant storage tank 4 in the above-illustrated apparatus. Conveniently a reaction catalyst may also be included in this tank. In another reactant storage tank, e.g., second reactant storage tank 8, an organic polyisocyanate or a polyisocyanate-polyol prepolymer is placed. The foaming agent may be supplied from a third storage tank, or, as is preferred according to the invention, the foaming agent may be included in at least one, and more preferably both, of the reactant storage tanks.

With flow controllers 40 and 42 set to deliver the desired ratio of reactants to mixing chamber 30, the reactants, propelled by the nitrogen gas pressure supplied by nitrogen tank 2, are conveyed through lines 26 and 34 and up to mixing chamber inlet valves 32 and 38, respectively. At this point timer 52 is set for a desired valve-opening time cycle, whereupon inlet valves 32 and 38 and outlet valve 50 are opened permitting the reactants to flow into and fill mixing chamber 30. As they travel through the mixing chamber, the reactants become fully admixed together and begin to froth, exiting through outlet valve 50 as a partially expanded material which continues to expand outside the chamber to its full free-rise volume. Thereafter, with the chamber full of reactants, timer 52 can be repeatedly set for a specified time thereby enabling dispensation of repeated, substantially uniform-size foam shots.

Not only does the apparatus of the invention enable repeated dispensation of substantially uniform-size small foam shots ranging in weight below 500 grams, and usually between about 2 and about 100 grams; but by virtue of the fact that the mixing chamber remains full of reactants, this apparatus also enables uniform, adequate mixing of the reactants. Thus the size, composition, and physical properties of small foam shots can be repeatedly duplicated and controlled. The presence of outlet valve 50 at the mixing chamber outlet and its use according to the teachings of the invention further minimizes reactant dripping and waste.

The apparatus of the invention can be utilized in any foam generating application such as making foam insulation, furniture parts, sporting goods, structural elements, etc. Being self-contained and amenable to variations in the size of its component parts, it can be easily transported from one location to another for the on-site generation and dispensation of foam.

The apparatus of the invention is of particular utility in on-site, small shot foam generating applications which require uniformity of both the size of the shots and the property of the resulting foam. These applications include, for example, foam-core picnic coolers and small, insulated food containers, small floats, electronic potting, metal-foam-metal sandwich shakes and shingles, small castings, and so forth.

The following examples are provided to illustrate the invention. In these examples, all proportions and percentages are given by weight unless otherwise specified.

EXAMPLE 1

A polyol blend, prepared from the following ingredients in the indicated proportions, was placed in first reactant storage tank 4:

| Ingredients: | Parts by weight |
| --- | --- |
| Oxypropylated pentaerythritol (560 hydroxyl number) | 40.0 |
| Oxypropylated methyl glucoside (460 hydroxyl number) | 18.0 |
| Phosphorus polyol (415 hydroxyl number) [1] | 9.0 |
| Tetramethyl butane diamine catalyst | 1.0 |
| Silicone surfactant [2] | 1.2 |
| Dichlorodifluoromethane foaming agent | 8.0 |
| Monofluorotrichloromethane foaming agent | 30.8 |

[1] A product of Wyandotte Chemical Co. identified as "Plura-col 480."
[2] A product of Dow Corning identified as DC-193.

A polyisocyanate-polyol prepolymer blend was placed in second reactant storage tank 8 which blend consisted of the following ingredients in the indicated proportions:

| Ingredients: | Parts by weight |
| --- | --- |
| Toluene diisocyanate (80% 2,4- and 20% 2,6 isomer) | 9.4 |
| Polymeric isocyanate [1] | 55.1 |
| Polymeric isocyanate [2] | 20.6 |
| Phosphorus diol (212 hydroxyl number) [3] | 14.4 |
| Benzoyl chloride cross-link inhibitor | 0.01 |
| Silicone surfactant [4] | 0.5 |
| Dichlorodifluoromethane foaming agent | 6.0 |

[1] A product of Kaiser identified as "NCO-20."
[2] A product of Kaiser identified as "NCO-10."
[3] A product of Mobil Oil Co. identified as "Vircol 82."
[4] A product of General Electric identified as "SF-1079."

Using the apparatus illustrated above and with reactants storage tanks 4 and 8 filled with the above ingredients, ten shots of foam were generated and dispensed from mixing chamber 30 using repeated ¼ of a second settings on timer 52. The resulting foam shots, which were substantially uniform in quality, were allowed to cure and then weighed. The results are tabulated below:

| Shot No.: | Shot weight (grams) |
| --- | --- |
| 1 | 8 |
| 2 | 8 |
| 3 | 8 |
| 4 | 8 |
| 5 | 8 |
| 6 | 9 |
| 7 | 8 |
| 8 | 8 |
| 9 | 8 |
| 10 | 9 |

EXAMPLE 2

The identical procedure of Example 1 was followed except that the repeated time intervals set on timer 52 were one second each instant of ¼ of a second. The resulting foam shots were again substantially uniform in quality. The weight of each foam shot is provided in the table below.

| Shot No.: | Shot weight (grams) |
| --- | --- |
| 1 | 34 |
| 2 | 34 |
| 3 | 35 |
| 4 | 34 |
| 5 | 34 |
| 6 | 35 |
| 7 | 34 |
| 8 | 34 |
| 9 | 34 |
| 10 | 34 |

I claim:

1. In a foaming apparatus for mixing first and second inter-reactive polyurethane foam-forming materials and for generating foam therefrom, which apparatus comprises
   (a) a first tank, having an outlet, for supplying said first material,
   (b) a second tank, having an outlet, for supplying said second material,
   (c) means for imposing gas pressure in said first and second tanks to expel said materials therefrom, and
   (d) a static mixing chamber having (i) a first inlet in communication with said first tank outlet through a first inlet valve, (ii) a second inlet in communication with said second tank outlet through a second inlet valve, and (iii) a mixing chamber outlet communicating with said first and second inlets,
the improvement which comprises a mixing chamber outlet valve for opening and closing said mixing chamber outlet and means linking said outlet valve and said first and second inlet valves for simultaneous opening and closing.

2. The apparatus of claim 1 in which said mixing chamber consists essentially of a hollow cylindrical tube having a plurality of curved axially displaced sheet-like elements extending in series longitudinally within said tube, each element extending to opposite portions of the wall of said tube throughout the element length and each element dividing its embracing portion of said tube into two laterally displaced subchambers, the total cross-sectional area of each of said subchambers being substantially constant throughout the length of its dividing element and with said elements being arranged in point-contact with one another along the tube axis and each element having its plane rotated approximately 90° from those of its contiguous neighboring elements.

3. The apparatus of claim 1 comprising a first flow control unit interposed between said first tank outlet and said first mixing chamber inlet valve and a second flow control unit interposed between said second tank outlet and said second mixing chamber inlet valve, said flow control units being adapted to maintain the flow of said materials from said first tank and said second tank to said mixing chamber at a substantially constant rate.

4. The apparatus of claim 3 wherein said mixing chamber consists essentially of a hollow cylindrical tube having a plurality of curved, axially displaced sheet-like elements extending in series longitudinally within said tube, each element extending to opposite portions of the wall of said tube throughout the element length and each element dividing its embracing portion of said tube into laterally displaced subchamber, the total cross-sectional area of each of said subchambers being substantially constant throughout the length of its dividing element and with said element being arranged in point-contact with one another along the tube axis and each element having its plane rotated approximately 90° from those of its contiguous neighboring elements.

5. The apparatus of claim 4 in which said means linking said mixing chamber outlet valve and first and second inlet valves comprises solenoids actuating each of said valves, which solenoids are connected to an electric timer.

6. The apparatus of claim 5 wherein said means for imposing gas pressure in each of said first and second tanks is a nitrogen tank which is in communication therewith.

7. The apparatus of claim 6 comprising a first filter element interposed between said first tank outlet and said first flow control unit and a second filter element interposed between said second tank outlet and said second flow control unit.

References Cited

UNITED STATES PATENTS

| | | | |
|---|---|---|---|
| 2,779,689 | 1/1957 | Reis Jr. | 264—544 |
| 3,091,551 | 5/1963 | Robertson | 117—105.5 |
| 3,110,552 | 11/1963 | Voelker | 260—2.5 BD X |
| 3,164,374 | 1/1965 | Ralph | 259—2 |
| 3,251,508 | 5/1966 | Borys | 222—145 X |
| 3,286,992 | 11/1966 | Armeniades et al. | 138—42 X |
| 3,488,154 | 1/1970 | Hronas | 222—145 X |
| 3,541,023 | 11/1970 | Cole III | 252—359 E |

OTHER REFERENCES

Frothing Rigid Urethane Foams, Plastics Technology, January 1964, p. 35.

Handbook of Foamed Plastics, Lake Pub. Co., 1965, Libertyville, Ill. Library of Congress Catalogue Card No. 65–13127. P.O. Call No. TP1183 F 6B4.

NORMAN YUDKOFF, Primary Examiner

J. SOFER, Assistant Examiner

U.S. Cl. X.R.

259—4; 264—54; 260—2.5 BC; 425—155